June 20, 1950    W. S. HARNEY, JR., ET AL    2,511,847
EXTRACTIVE DISTILLATION OF SECONDARY BUTYL
ALCOHOL FROM METHYL ETHYL KETONE
Filed Oct. 12, 1948
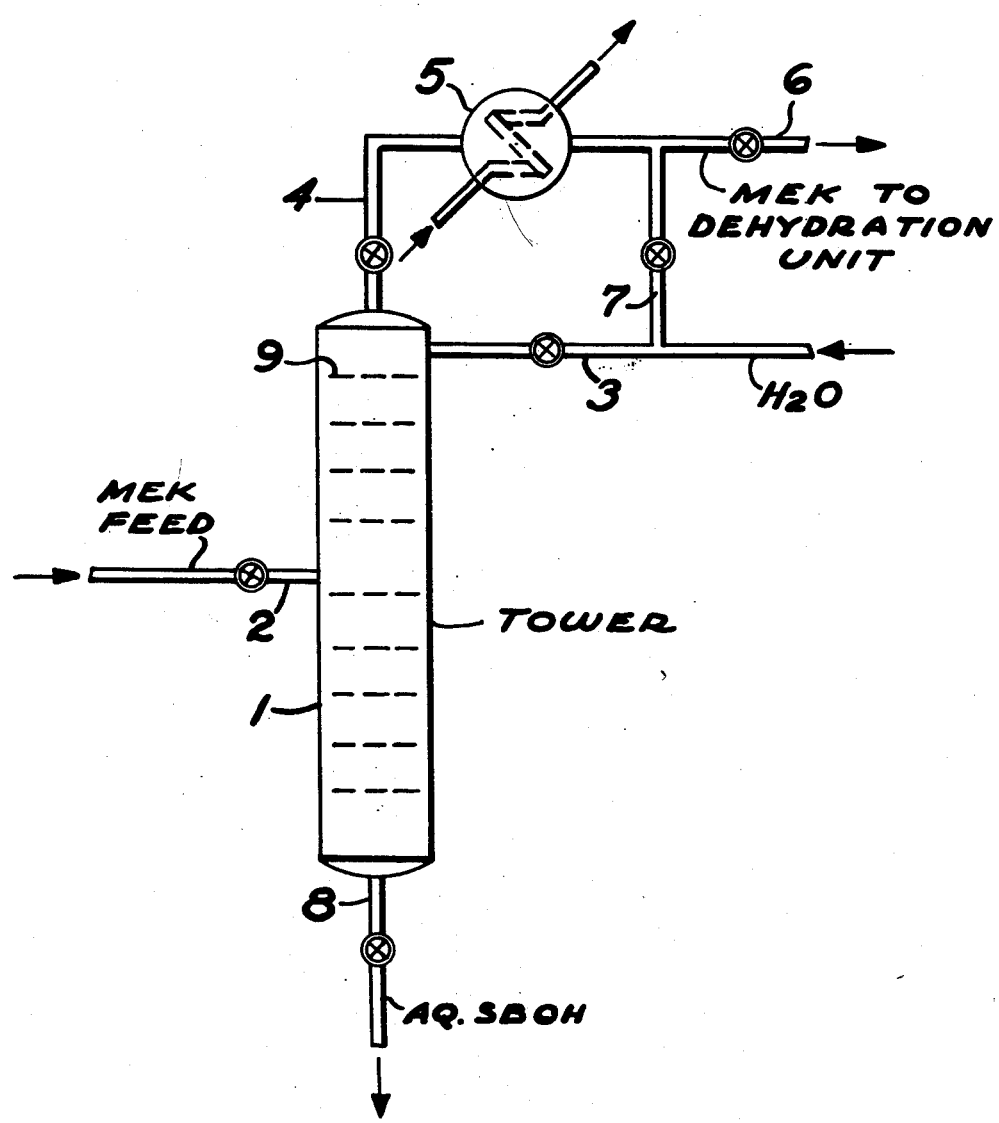
William Selby Harney, Jr.
Sidney Schneider   Inventors
By Henry Berk   Attorney

Patented June 20, 1950

UNITED STATES PATENT OFFICE 2,511,847

EXTRACTIVE DISTILLATION OF SECONDARY BUTYL ALCOHOL FROM METHYL ETHYL KETONE

William Selby Harney, Jr., and Sidney Schneider, Elizabeth, N. J., assignors to Standard Oil Development Company, a corporation of Delaware Application October 12, 1948, Serial No. 54,206

5 Claims. (Cl. 202—39.5)

This invention relates to the purification of methyl ethyl ketone and particularly to the removal of secondary butyl alcohol in its final traces from methyl ethyl ketone.

Methyl ethyl ketone is produced commercially by the catalytic dehydrogenation of secondary butyl alcohol. The crude ketone discharged from the catalytic conversion unit contains about 80 weight per cent methyl ethyl ketone, while the remainder is predominantly secondary butyl alcohol with small amounts of acetone, isopropanol and water as low concentration contaminants. In finishing the crude ketone by fractional distillation, the principal separation demanded is that between the methyl ethyl ketone and the secondary butyl alcohol. The limitations on product purity are imposed by the extent to which secondary butyl alcohol can be removed from the methyl ethyl ketone. This separation and removal of secondary butyl alcohol by fractional distillation becomes difficult and expensive when final traces of secondary butyl alcohol are present.

It is an object of this invention to provide for the efficient separation and substantially complete removal of secondary butyl alcohol from methyl ethyl ketone by conducting the fractional distillation under extractive distillation conditions employing water as the distillation solvent.

It is also an object of this invention to provide for the efficient separation and substantially complete removal of secondary butyl alcohol from methyl ethyl ketone by conducting the fractional distillation under extractive distillation conditions employing water as the solvent at sub-atmospheric pressures.

The effect of water in improving the separation of methyl ethyl ketone and secondary butyl alcohol by distillation is unexpected. In the "dry" state, secondary butyl alcohol (B. P. 99.5° C.) and methyl ethyl ketone (B. P. 79.6° C.) boil about 20° C. apart. When "wet" the water present causes binary azeotropes of both compounds to form. The secondary butyl alcohol-water binary boils at 87.3° C., while the methyl ethyl ketone water binary boils at 73.4° C. This is a boiling joint spread of about 14° C. in the "wet" state as compared with a 20° C. spread in the "dry" state. It would be expected that the pressure of water would hinder the separation of the ketone and alcohol due to the formation of closer boiling azeotropes. However, it has been found that the effect of water on the relative volatility of the compounds of the mixture produces the opposite effect.

Experimental data listed in Table I show the increase in relative volatilities (alpha) for the system methyl ethyl ketone-secondary butanol in the presence of water. In the experimental work, mixture of methyl ethyl ketone and secondary butyl alcohol of various concentrations were charged to an equilibrium still and samples of vapor in equilibrium with the liquid were taken and analyzed to determine values of "alpha" for this system in the "dry" state. Then, water was added to the equilibrium still and samples of vapor and liquid were again analyzed and values of "alpha" were calculated for the "wet" state, in the same way, by the following equation:

$$\text{alpha} = \frac{\text{mol \% MEK in vapor}}{\text{mol \% SBOH in vapor}} \times \frac{\text{mol \% SBOH in liquid}}{\text{mol \% MEK in liquid}}$$

The data in Table I illustrate that due to the increase in alpha for the system, the separation is highly improved by conducting a fractional distillation under extractive distillation conditions in the presence of water as a solvent.

TABLE I

*Effect of water on the relative volatility (alpha) in the system MEK-SBOH at atmospheric pressure*

VALUES OF ALPHA

| Mol per cent MEK in liquid | No water present | 30-35 mol percent water in the liquid phase | 86-88 mol percent water in the liquid phase |
|---|---|---|---|
| 20 | 2.80 | -------- | 2.85 |
| 40 | 2.60 | -------- | 2.84 |
| 45 | 2.52 | 2.58 | -------- |
| 60 | 2.34 | 2.52 | 2.68 |
| 80 | 1.86 | 2.28 | 2.43 |
| 90 | 1.54 | 2.12 | -------- |

It is to be observed that the effectiveness of water in increasing alpha is greater in the range of high MEK contents. This has great practical importance because the problem of finishing the ketone in commercial operation occurs in ranges where the MEK content is high, e. g., 80 to 100%. It is known that in the MEK-SBOH system the value of alpha rapidly approaches unity at the higher concentrations of MEK such as 80 to 100%.

The data in Table II illustrate that under given operating conditions the MEK distillate produced when water is present as the distillation solvent always contains more MEK (on a water free basis) than the distillate produced from an anhydrous charge. For example, at a reflux ratio of 3 to 1, the presence of 23 mol per cent water produces an increase in the strength of the distillate of 1.2%; that is, from 97.6 weight per cent MEK to 98.82 weight per cent MEK, which is an extremely sharp increase at this high purity level. As the mol per cent water employed as the distillation solvent increases, even higher purity product is obtained as indicated in the table.

TABLE II

*Results of experiments on the continuous fractional distillation of synthetic crude MEK (80% MEK-20% SBOH) at 3:1 reflux ratio and atmospheric pressure and in the presence of varying concentrations of water*

| Run No. | Mol of Water Present in the Charge as Extractive Distillation Solvent | Distillate Strength, wt. percent MEK (calculated on a water-free basis) |
| --- | --- | --- |
| 1 | 0 | 97.60 |
| 2 | 23.0 | 98.82 |
| 3 | 30.0 | 99.14 |
| 4 | 44.2 | 99.32 |

It should be observed that the distillate strength is reported on a water free basis. On an average the distillate from the water extractive distillation operation will contain about 11 to 12% water which, of course, would be removed in a subsequent simple finishing operation either by a combination of caustic soda dehydration and fractional distillation or by azeotropic distillation.

A typical analysis of the distillate obtained from the extractive distillation operation in the presence of water is that produced in run #3 of Table II.

This analysis is as follows:

TABLE III

*Composition of distillate, run #3, Table II*

Weight per cent SBOH = 0.75
Weight per cent MEK = 87.40
Weight per cent Water = 11.84

The above water extractive distillation operations were carried out at atmospheric pressure. Data have also been obtained which show that additional increases in relative volatility (alpha) can be produced by carrying out the water extractive distillation operation at subatmospheric pressures. Distillation in the presence of water at reduced pressures is more advantageous than distillation in the pressure of water at atmospheric pressure.

Table IV contains data which illustrate the effect of water and reduced pressure on the relative volatility in the MEK-SBOH system. The data illustrate that the presence of water alone or operation under reduced pressure alone produces a substantial increase in alpha, but that, however, both the presence of water and distillation under reduced pressure produces still greater increases in alpha. This substantial increase in alpha also prevails in the ranges of higher MEK concentrations in which the separation by distillation is most difficult.

TABLE IV

*Effect of water and reduced pressure on the relative volatility (alpha) in the MEK-SBOH system*

VALUES OF ALPHA

| Mol Per cent MEK in Lqiuid | 0% $H_2O$ at 760 mm. Hg. | 30 mol per cent $H_2O$ at 760 mm. Hg. | 0% $H_2O$ at 350 mm. Hg. | 30 mol per cent $H_2O$ at 350 mm. Hg. |
| --- | --- | --- | --- | --- |
| 30 | 2.70 | 2.9 | 3.3 | 4.1 |
| 50 | 2.47 | 2.6 | 3.0 | 3.7 |
| 70 | 2.14 | 2.4 | 2.6 | 3.3 |
| 80 | 1.86 | | | |

It has been found that the effect of increase in relative volatilities obtained by the use of water and reduced pressure can be translated into improvement and product purity according to the following data.

(a) 0% water at 760 mm. Hg will give 98.0 weight per cent MEK product.
(b) 0% water at 350 mm. Hg will give 99.4 weight per cent mol product.
(c) 30 mol per cent water at 350 mm. Hg will give 99.8 weight per cent MEK product.

In carrying out the process of the invention the crude mixture of MEK and secondary butyl alcohol is subjected to a distillation operation illustrated in the diagrammatic drawing in which the crude feed is introduced via line 2 to a distillation tower 1 equipped with trays 9 at a point below the top, preferably at about the mid-point thereof, and in which water is fed to the top of the tower or at a point near the top thereof via line 3 in sufficient quantity to maintain a composition between 15 and 98 mol per cent water, preferably, 30 to 90 mol per cent water in the liquid phase in the distillation column. During the distillation operation the liquid water internal reflux passes down through the tower countercurrent to the rising vapors. The presence of water effects an increase in the relative volatility in favor of the MEK over the secondary butyl alcohol such that the water allows the removal overhead of MEK substantially free of secondary butyl alcohol via line 4. Of course some water distills overhead in addition to the MEK. However, this water is easily removed from the MEK distillate in a subsequent purification step. The overhead is condensed in condenser 5 and the MEK substantially free of secondary butanol is led to a dehydration unit via line 6. Reflux of the condensed overhead may be made to the tower via line 7. The bottoms from the distillation zone withdrawn via line 8 consist of an aqueous solution of secondary butyl alcohol which may be discarded or processed for recovery of the alcohol therefrom.

It has been found that the presence of 15 to 98 mol per cent water in the liquid on the bulk of the plates of the distillation tower in which the separation is being effected will produce the necessary volatility increase to provide the separation desired. However, a preferred range of operation is the use of 30-90 mol per cent water.

The distillation operation may take place on an anhydrous feed mixture or on an aqueous feed mixture. The feed likewise may or may not be pretreated for the removal of low boiling contaminants therefrom. Any low boiling contaminants whose volatility is not effected during the distillation operation and which pass overhead with the MEK can easily be removed in the subsequent finishing step. The important separation, of course, being effected during the water extractive distillation, is that of secondary butyl alcohol from the MEK.

When the water extractive distillation operation is carried out under subatmospheric pressure, pressures of 100 mm. Hg to 500 mm. Hg are preferred.

The temperature of the crude MEK feed to the distillation zone is preferably close to the temperature of the liquid on the plate at the point of introduction of the feed although it may be lower to partly condensed vapors extending to the feed plate. For continuous efficient operation the water must be added continuously near the top of the column while the crude MEK being purified is continuously fed into the column at a lower point, preferably near the mid-point of the column, and while sufficient heat is provided to afford distillation throughout the column. The feed stream may be preheated to a temperature close to that of the internal liquid under equilibrium boiling conditions at the point of introduction. The preheated feed may be liquid, partly vaporized, or completely vaporized when introduced into the extractive distillation column. Vapors of the mixture being purified pass upwardly through the distillation zone in contact with descending internal liquid reflux under equilibrium, reboiling and refluxing conditions.

Without attempting to explain the mechanism by which the desired separation occurs in the distillation column, it can be said that the process is one of vapor-liquid extraction in which the vapors contain a greater concentration of MEK relative to secondary butyl alcohol than under the normal fractional distillation conditions in the absence of the considerable amounts of aqueous internal reflux. It is evident from the results obtained that the water employed within the limits specified increases the vapor pressure of MEK in comparison with the vapor pressure of secondary butyl alcohol, thus allowing the MEK to pass overhead from the distillation zone more completely free of secondary butyl alcohol.

What is claimed is:

1. The method of separating methyl ethyl ketone from a mixture thereof with secondary butyl alcohol which comprises continuously feeding the mixture to a fractional distillation zone at an intermediate point thereof, continuously adding water to the fractional distillation zone substantially above the feed point of the mixture to maintain an internal liquid reflux having a water content in the range of 15 to 98 mol per cent below the point of addition of the water, distilling from said distillation zone a vaporous mixture wherein the distilled vaporous mixture ascends countercurrent to the liquid internal reflux and removing from the distillation zone a distillate comprising methyl ethyl ketone substantially free of secondary butyl alcohol.

2. A process according to claim 1 in which the water is fed to the fractional distillation zone in amounts sufficient to maintain 30 to 90 mol per cent water in a distillation zone below the point of addition of water.

3. A process according to claim 1 in which the distillation is conducted at atmospheric pressure.

4. A process according to claim 1 in which the distillation is carried out at subatmospheric pressure.

5. A process according to claim 1 in which the distillation is carried out at subatmospheric pressure of 100 to 500 mm. Hg.

WILLIAM SELBY HARNEY, JR.
SIDNEY SCHNEIDER.

REFERENCES CITED

The following references are of record in the file of this patent:

UNITED STATES PATENTS

| Number | Name | Date |
|---|---|---|
| 1,929,901 | Ricard et al. | Oct. 10, 1933 |
| 2,179,991 | Bright et al. | Nov. 14, 1939 |
| 2,290,636 | Deanesly | July 21, 1942 |
| 2,321,748 | Hopkins et al. | June 15, 1943 |

OTHER REFERENCES

"Methyl Ethyl Ketone," published 1938 by Shell Chemical Company, San Francisco, California, copy in Division 25, pages 25–31.

"Handbook of Chemistry and Physics," 28th edition, published 1944 by Chemical Rubber Publishing Company, 2310 Superior Avenue, N. E. Cleveland, Ohio. Pages 674 and 675.